US010501186B2

(12) United States Patent
Seibt

(10) Patent No.: US 10,501,186 B2
(45) Date of Patent: Dec. 10, 2019

(54) FURNISHING ITEM FOR A VEHICLE AS WELL AS A VEHICLE WITH SUCH A FURNISHING ITEM

(71) Applicant: Airbus Operations GmbH, Hamburg (DE)

(72) Inventor: Christian Seibt, Hamburg (DE)

(73) Assignee: Airbus Operations GmbH (DE)

( * ) Notice: Subject to any disclaimer, the term of this patent is extended or adjusted under 35 U.S.C. 154(b) by 402 days.

(21) Appl. No.: 15/418,900

(22) Filed: Jan. 30, 2017

(65) Prior Publication Data
US 2017/0137131 A1    May 18, 2017

Related U.S. Application Data

(63) Continuation of application No. PCT/EP2015/066527, filed on Jul. 20, 2015.

(30) Foreign Application Priority Data

Jul. 30, 2014 (DE) .................. 10 2014 110 808

(51) Int. Cl.
B64D 11/00 (2006.01)
B64D 11/02 (2006.01)
(Continued)

(52) U.S. Cl.
CPC ............ B64D 11/02 (2013.01); B64C 1/1407 (2013.01); B64D 11/00 (2013.01); B64D 11/06 (2013.01); *B60Y 2200/50* (2013.01)

(58) Field of Classification Search
CPC ..... B64D 11/00; B64D 11/02; B64D 11/0023; B64D 11/0606; B64D 2011/0046; B64D 2011/0069; B64D 2011/0076
See application file for complete search history.

(56) References Cited

U.S. PATENT DOCUMENTS 3,813,836 A * 6/1974 Dielman ............... E04H 1/1266
4/664
7,152,257 B2 * 12/2006 Lasch ................... E04H 1/1216
4/661
(Continued)

FOREIGN PATENT DOCUMENTS

EP    2 815 974 A1    12/2014
EP    2 873 616 A1    5/2015
(Continued)

OTHER PUBLICATIONS

International Search Report PCT/EP2015/066527 dated Sep. 22, 2015.

*Primary Examiner* — Richard G Davis
(74) *Attorney, Agent, or Firm* — Lerner, David, Littenberg, Krumholz & Mentlik, LLP

(57) ABSTRACT

A furnishing item for a vehicle includes a first wall with an access opening situated therein, a door and an oblong flap. The door is arranged on the first wall so that it is swivable relative to the access opening around a first rotational axis. The oblong flap is arranged on the access opening in a vertical direction parallel to the door, and swivelably arranged on a second rotational axis, which is situated on a side of the access opening lying opposite the first rotational axis, and arranged parallel to the first rotational axis. The door and oblong flap extend from the first rotational axis or second rotational axis to the second rotational axis or first rotational axis and together completely close the access opening in a closed state.

12 Claims, 3 Drawing Sheets

(51) Int. Cl.
*B64C 1/14* (2006.01)
*B64D 11/06* (2006.01)

(56) References Cited

U.S. PATENT DOCUMENTS

| | | | |
|---|---|---|---|
| 7,364,119 B2* | 4/2008 | Sprenger | B64D 11/00 244/118.6 |
| 2002/0062521 A1* | 5/2002 | Itakura | B64D 11/02 4/664 |
| 2005/0116099 A1* | 6/2005 | Pho | B64D 11/02 244/118.5 |
| 2009/0065641 A1 | 3/2009 | Koehn et al. | |
| 2012/0261509 A1 | 10/2012 | Grant et al. | |
| 2013/0001359 A1* | 1/2013 | Schliwa | B64D 11/02 244/118.6 |
| 2014/0123571 A1* | 5/2014 | Swain | B64D 11/0023 52/79.1 |
| 2014/0138483 A1 | 5/2014 | Schliwa et al. | |
| 2014/0360099 A1* | 12/2014 | McIntosh | E03D 11/00 49/371 |
| 2015/0096118 A1* | 4/2015 | McIntosh | B64D 11/02 4/664 |

FOREIGN PATENT DOCUMENTS

| | | |
|---|---|---|
| JP | 2001 098773 A | 4/2001 |
| WO | 2014/093541 A1 | 6/2014 |
| WO | 2015/050600 A1 | 4/2015 |

\* cited by examiner

FURNISHING ITEM FOR A VEHICLE AS WELL AS A VEHICLE WITH SUCH A FURNISHING ITEM

CROSS-REFERENCE TO RELATED APPLICATIONS

This application is a continuation of International Application No. PCT/EP2015/066527, filed Jul. 20, 2015, published in English, which claims priority from German Application No. 10 2014 110 808.6, filed Jul. 30, 2014, all of which are incorporated herein by reference.

FIELD OF THE INVENTION

The invention relates to a furnishing item for a vehicle as well as to a vehicle with such a furnishing item.

BACKGROUND OF THE INVENTION

When setting up passenger cabins in means of transportation, one focus lies in optimizing the space for passengers, so as to maximize the number of available seats. Consideration must here be given to seats for crewmembers, prescribed safety equipment, utilities and lavatories, which limit the available space.

For reason of efficiency, dense seating configurations may be realized in particular in commercial aircraft, resulting in a relatively small distance between rows of passenger seats, cabin monuments or other furnishing items. For this reason, openings for accessing a furnishing item are often arranged or scaled down in such a way that a door which closes the access opening permits just enough passage width. Nevertheless, it might become necessary for a furnishing item to be used by a special group of users, e.g., limited-mobility or older individuals, who require a larger passage width and support measures.

BRIEF SUMMARY OF THE INVENTION

As a consequence, an aspect of the invention is directed to a furnishing item that is as compact as possible, offers a sufficiently wide opening, while still providing a sufficiently wide passageway in front of the opening given a dense seating configuration.

Proposed is a furnishing item for a vehicle comprising a first wall with an access opening situated therein, a door and an oblong flap, wherein the door is arranged on the first wall so that it is swivelable relative to the access opening around a first rotational axis, wherein the oblong flap is arranged on the access opening in a vertical direction parallel with a primary axis of extension to the door, and swivelably arranged on a second rotational axis, which is situated on a side of the access opening lying opposite the first rotational axis, and arranged parallel to the first rotational axis, wherein the door and oblong flap extend from the first or second rotational axis to the second or first rotational axis and together completely close the access opening in a closed state.

One special feature of the furnishing item according to an embodiment of the invention is the oblong flap, which in a vertical direction is arranged on the right or left next to the actual door, and together with the latter can close the access opening for the furnishing item. This allows the furnishing item user to utilize an expandable access opening to the furnishing item, even given an unchanged, relatively narrow passage width of an adjoining cabin section. Access to the furnishing item here takes place primarily by opening the door, which has a width lying within the range usual for the cabin. By contrast, the flap may have a clearly smaller width, and is here exclusively limited to providing an additional opening width with the door open.

The design for the door and flap may be selected based on a choice of customary materials and a construction that suits the latter. It may be especially advantageous in an aircraft to manufacture a door and flap out of a composite material, wherein the latter comprises a core layer comprised of a honeycomb material, and is outwardly covered with cover layers made in particular out of a fiber-reinforced plastic. Of course, other single or multiple-layer structures may be selected, which impart an especially low weight to the door and flap at a sufficient rigidity.

It should be possible to lock or fix the flap at least in its closed position. The term "closed" here relates to a position in which the flap closes the access opening in conjunction with the door. Depending on the intended use, it may also make sense to additionally fix the flap in positions deviating therefrom, for example in a position swiveled either partially or completely inward or partially or completely outward. Locking may take place automatically by swiveling the flap, for example with a latching or catching mechanism, a trap or a safety catch. In addition, locking may also be performed manually. Locking may take place at an upper and/or lower edge of the flap, wherein the control element necessary for releasing or locking may also be situated in an intermediate position between the upper edge and lower edge.

In an especially advantageous embodiment, the flap comprises a handle that extends at an angle from the flap and lies in a plane that comprises a distance of at most 20 cm from the second rotational axis, wherein the handle lies on a flat side of the flap, which points into the interior of the lavatory in the closed state of the second door segment. The smaller the distance between the second rotational axis and a tensile force exerted on the handle by an individual, the better the handle may align itself in the direction of the tensile force as soon as the flap is swivable freely. In particular given a very narrow flap, the latter may permit any swiveling motion desired when in an unlocked state, since a flap with a small width extends only slightly into the cabin, and the danger of collisions between the flap and other parts inside the vehicle may be virtually precluded.

In a preferred embodiment, the handle extends perpendicular to the flap. With the door closed, an individual may use the handle to hold on to inside the furnishing item, for example during turbulence, since this handle would be no different than a handle fixedly secured to a wall in terms of its usability. The handle may protrude further outward with the flap open, making it usable from outside as a supporting measure, for example as a standing aid for older individuals.

The at least one handle may further be arranged horizontally or vertically in relation to a base or floor area of the furnishing item. As an alternative, the handle may be twistably or swivelably arranged on the flap, so that the handle may be horizontally or vertically arranged, if needed.

The at least one handle may further also be swivelably arranged on the flap, wherein the swiveling axis may run parallel to the primary extension of the handle.

It is especially preferred for the door to comprise a width that is at least about two times the width of the flap. The door may further also comprise a width that is even larger, for example three times, four times, five times the width of the flap, etc. In particular, the width of the flap is adjusted to the size and orientation of a handle arranged thereon. Given an access opening with a width of around 20 inches (50.8 cm), a resultant door width may be enough to be able to enter and again leave the furnishing item according to the invention. On the other hand, a conventional 20 inch wide door may also be enhanced by a two, three, four or more inch wide flap, making it possible to replace and utilize conventional elements.

In an especially advantageous embodiment, the flap is designed so that it is swivable inwardly and outwardly from a closed position at least by a respective 90°. When the flap is inwardly swiveled, the flap does not pose any disruption on an exterior side of the furnishing item. This makes a lot of sense in particular given a limited passageway width. In addition, a handle integrated on the flap may also be used on an exterior side, for example by an individual to hold on to or draw closer to the furnishing item, which is advantageous in particular for individuals with limited mobility. However, this does not require that the handle be fixedly secured to an exterior side of the furnishing item so as to extend into the passageway.

It is especially preferred that the flap be set up to be swiveled from a closed position by at least 260° around the second rotational axis. As a consequence, for example, the flap is swivable from a mechanical contact point in the interior of the furnishing item up to a mechanical contact point in an exterior surface of the furnishing item, thereby completely and flexibly covering any and all areas of application.

The at least one handle provides at least two different vertical and spaced apart gripping positions. This may be realized by just a single handle, which comprises a longitudinal extension of a kind that permits gripping at varying height positions. As a consequence, for example, a position [sic] sitting in the furnishing item may assume a deeper gripping position, for example to stand up or move while seated from a toilet to a folding seat. However, a standing individual may also hold onto a higher gripping position as well.

For example, the different vertically spaced apart gripping positions may also be realized by two or more handles, which in particular are arranged one over the other.

One advantageous embodiment comprises a second wall, which is situated at an angle relative to the first wall in an area near the second rotational axis, as well as a seating arrangement that is located in an area of the second wall facing the access opening. A special feature here involves the seating arrangement, which is located right at an opening of the furnishing item, and thus may be reached directly from the opening. If the furnishing item is a lavatory, washroom, or changing area, an individual with limited mobility may move directly from a wheelchair parked in front of the furnishing item to the seating arrangement. An assistant should normally not be required for this purpose. If the individual in question is on the seating arrangement, which is located entirely in the furnishing item given its arrangement on the second wall, the individual may close the door and subsequently enjoy complete privacy. As a consequence, the furnishing item according to an embodiment of the invention does not require that two adjacent lavatories, which may be joined together by removing or opening an intermediate wall, be simultaneously blocked to allow an individual in a wheel chair to stay therein. The wheelchair does not have to remain in the furnishing item while the individual is in the furnishing item. Another advantage lies in the fact that the individual may independently stay and move around in the furnishing item.

In an advantageous embodiment, the furnishing item comprises a toilet, wherein the seating arrangement may be a seat or a folding seat, and comprises a seat height corresponding to the seat height of the toilet. The seating arrangement may be located on the second wall by means of a variety of different fittings. For example, the wall may also be fabricated out of a sandwich material consisting of a light honeycomb fabric as the core layer with outer cover layers. Required points of force application for the seating arrangement may have local reinforcements, which may transmit the force into the second wall or adjoining structural elements, for example by way of struts, frame parts or suitable, large-surface load application elements. The second wall may also comprise a construction that deviates therefrom, which is based on a local frame structure that is only clad with a visually attractive covering, wherein the seating arrangement is directly attached to the frame structure.

The folding seat preferred for an especially space-saving realization is further to be understood as a device having a seat surface, which is arranged on the second wall so that it is swivable by means of a hinge, wherein the hinge line preferably lies in or parallel to a seating level defined by the seating surface. The type of folding seat is not to be limited within the framework of the configuration of the furnishing item according to an embodiment of the invention. However, it would be beneficial to use the smallest, thinnest and lightest folding seat possible, so as to only negligibly increase the overall weight of the furnishing item according to the invention by providing the folding seat, and to enable a space-saving accommodation of the folded up folding seat.

The furnishing item is selectable from a group of furnishing units, wherein the group comprises a room inside the vehicle, a vehicle cabin, a lavatory, washroom, storage cabinet and relaxation room.

The invention further relates to an aircraft with a cabin, several passenger seats and at least one such furnishing item.

In an advantageous embodiment, the furnishing item is a furnishing module integrated into a cabin monument. The furnishing module may be designed according to any of the above described embodiments.

BRIEF DESCRIPTION OF THE DRAWINGS

Additional features, advantages and possible applications of the present invention may be gleaned from the following description of the exemplary embodiments and the figures. All described and/or graphically depicted features here comprise the subject matter of the invention whether taken separately or in any combination, even independently of their composition in the individual claims or back references thereto. In addition, the same reference numbers on the figures stand for the same or similar objects.

DETAILED DESCRIPTION

Figure 1:
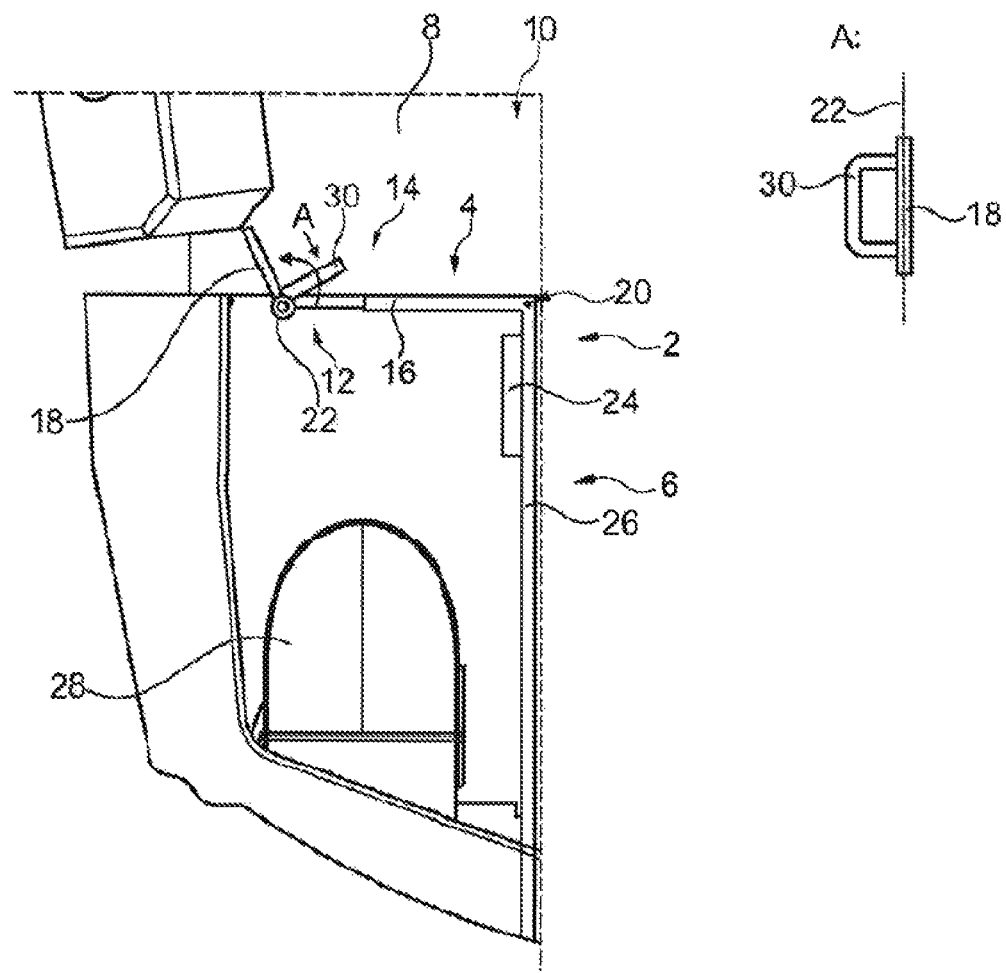
FIGS. 1 and 2 show a top view of a furnishing item.

FIG. 1 presents a top view of a furnishing item 2, which is designed as a lavatory 2 that comprises a first wall 4 and a second wall 6, which are essentially arranged at a right angle relative to each other. In order to enter the furnishing item 2 from an aisle 8 of a cabin 10, an access opening 12 is present in the first wall, which is closable by a door arrangement 14 that comprises a door 16 and a narrow flap 18 situated parallel to the door 16.

The door 16 is here arranged so that it is swivable around a first rotational axis 20 located in an area of the first wall 4 closest to the second wall 6. The flap 18 is mounted so that it is swivable around a second rotational axis 22 that runs parallel to the first rotational axis 20 and is located opposite the first rotational axis 20. The distance between the two swiveling axes 20 and 22 is selected in such a way that the door 16 and flap 18 may completely close the access opening 12.

Situated in an area of the second wall 6 lying closest to the first wall 4 is a seating arrangement in the form of a folding seat 24, which is arranged so that it is swivable around a swiveling axis 26, and is movable into a folded-up neutral position or a folded-down use position.

Located inside the furnishing item 2 is a toilet 28 arranged opposite the access opening 12, whose seat height corresponds to the seat height of the folding seat 24 and vice versa. For example, if an individual with limited mobility wishes to use the toilet 28, the door 16 must first be opened, and then the flap 18, after which the folding seat 24 is folded down. The individual in question may then slide onto the folding seat 24 from the wheelchair, and is then located completely inside the lavatory 2. As a consequence, this allows a sliding from the folding seat 24 onto the toilet 28 while maintaining complete privacy.

Arranged on the flap 18 swiveled upwardly outward on FIG. 1 is a handle 30, which lies in a plane that preferably also contains the second rotational axis 22. Of course, the handle 30 may also be spaced somewhat further apart from the rotational axis 22 along the flap 18, but the distance should be as small as possible. When the flap 18 is open, it is swivable around the second rotational axis 22, so that the handle 30 may assume any orientation desired, and be used from the inside and outside.

The individual may grasp the handle 30 to move from a wheelchair in the aisle 8 to the folding seat 24, wherein the handle 30 is then aligned so as to follow the tensile force exerted by the individual. As a consequence, an always ideally aligned handle 30 may be used during the entire process of moving from a wheelchair to the folding seat 24 or vice versa. If the flap 18 is locked into a closed position, the individual in the interior of the furnishing item 2 may of course always hold on to it. If the flap 18 is closed, the handle 30 also does not outwardly protrude, thus giving the lavatory 2 a harmonious outward appearance.

For example, the width of the door may measure 18 inches, while the flap 18 may be two inches wide. Of course, different dimensions may also be selected, in particular to comply with a required passageway width.

Figure 2:
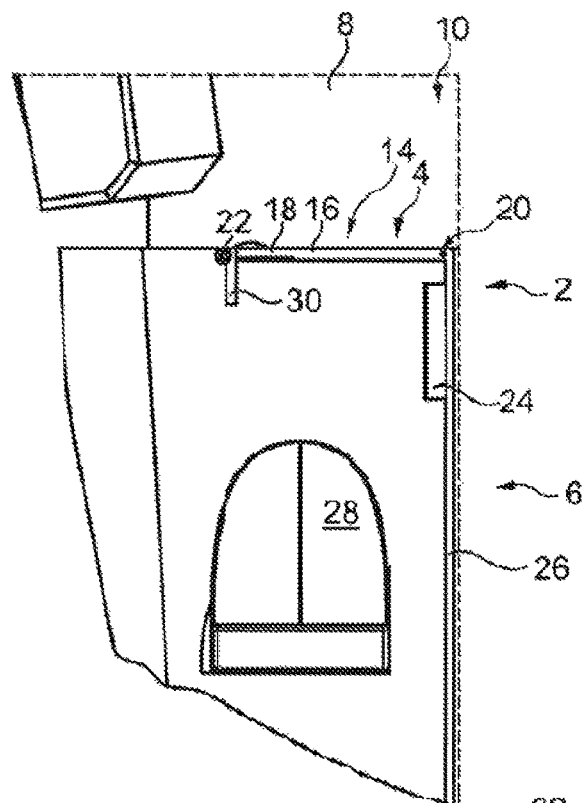

FIG. 2 shows the furnishing item 2, in which the door arrangement 4 is completely closed, and the handle 30 in the furnishing item 2 points toward the toilet 28. The handle may there be used by an individual who is seated on the toilet 28 or folding seat 24.

Figure 3:
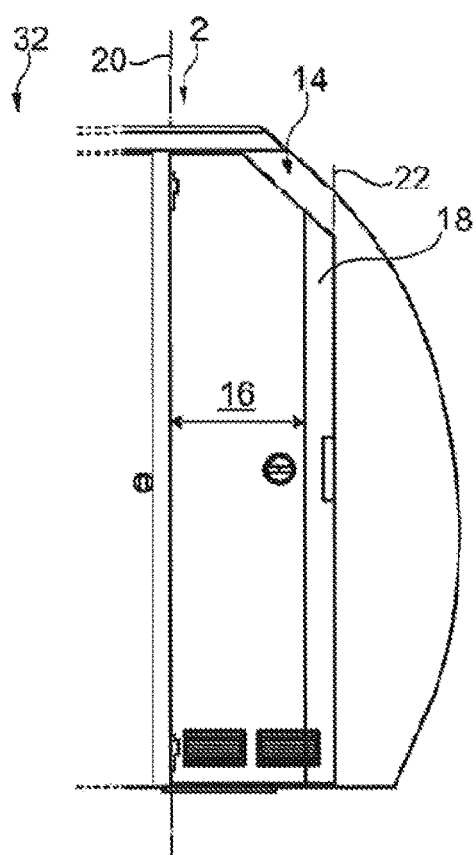
FIG. 3 shows a front view of a furnishing item.

FIG. 3 presents a front view of the furnishing item 2, which more clearly illustrates the dimensional proportions between the flap 18 and door 16. The furnishing item 2 is positionable in a monument configuration, which is situated adjacent to additional furnishing items. For example, an adjacent furnishing item 32 with a similar or conventional construction may be present.

Figure 4:
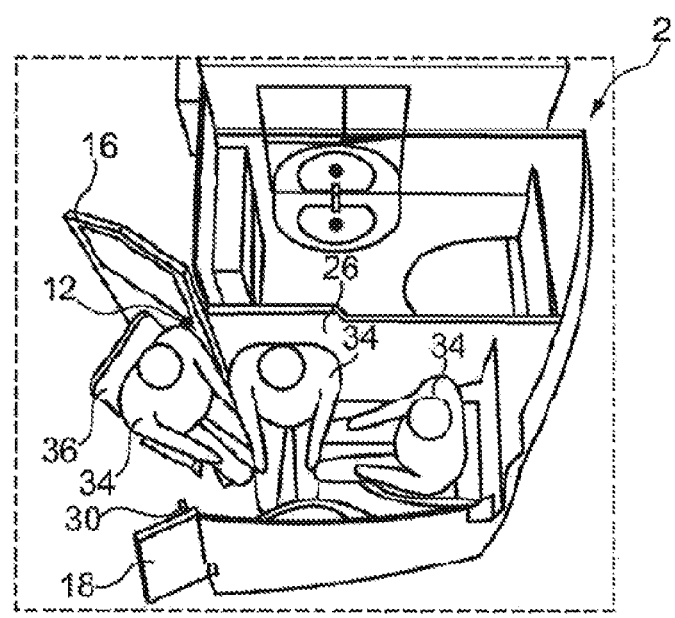
FIG. 4 shows a three-dimensional view of a furnishing item with an individual entering into the furnishing item.

Finally, FIG. 4 presents a three-dimensional view showing how an individual 34 gains access to a furnishing item 2 according to the invention from a wheelchair 36. The wheelchair 36 rolls in front of the access opening 12, from where the individual 34 may open the door 16 and flap 18 and then move toward a toilet 28 located therein, wherein a seating arrangement 24 arranged on the second wall 26 may be used for this purpose.

In addition, let it be noted that "comprising" does not preclude any other elements or steps, and that "an" or "a" does not rule out a plurality. Let it further be noted that features that were described with reference to one of the above exemplary embodiments may also be used in combination with other features in other exemplary embodiments described above. Reference numbers in the claims are not to be regarded as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A furnishing item for a vehicle, comprising:
a first wall with an access opening situated therein;
a door; and
an oblong flap,
wherein the door is arranged on the first wall so that the door is swivelable relative to the access opening around a first rotational axis,
wherein the oblong flap is arranged on the access opening in a vertical direction parallel to the door, and swivelably arranged on a second rotational axis situated on a side of the access opening lying opposite the first rotational axis, and arranged parallel to the first rotational axis,
wherein the door and oblong flap extend from the first rotational axis or second rotational axis to the second rotational axis or first rotational axis and together completely close the access opening in a closed state,
wherein the door comprises a width at least two times a width of the flap, and
wherein the flap comprises a handle extending at an angle from the flap and lying in a plane that comprises a distance of at most 20 cm from the second rotational axis.

2. The furnishing item according to claim 1, wherein the handle extends perpendicular to the flap.

3. The furnishing item according to claim 1, wherein the flap is configured so as to be swivelable inwardly and outwardly from a closed position at least by a respective 90°.

4. The furnishing item according to claim 3, wherein the flap is configured so as to be swivelable from a closed position by at least 260° around the second rotational axis.

5. The furnishing item according to claim 1, wherein the at least one handle provides at least two different gripping positions spaced vertically apart from each other.

6. The furnishing item according to claim 1, comprising at least two handles.

7. The furnishing item according to claim 1, further comprising:
a second wall situated at an angle relative to the first wall in an area near the second rotational axis; and
a seating arrangement arranged in an area adjacent to the second wall, the area facing the access opening.

8. The furnishing item according to claim 7, wherein the seating 1 arrangement is a fixed seat or a folding seat.

9. The furnishing item according to claim 8, further comprising a toilet, wherein the seating arrangement is a seat or a folding seat, and comprises a seat height corresponding to a seat height of the toilet.

10. The furnishing item according to claim 1, wherein the furnishing item is selected from a group of furnishing items, with the group consisting of:
- a room in a vehicle,
- a vehicle cabin,
- a lavatory,
- a washroom,
- a storage cabinet,
- a relaxation room.

11. An aircraft with a cabin, several passenger seats and at least one furnishing item comprising:
- a first wall with an access opening situated therein;
- a door; and
- an oblong flap,
  wherein the door is arranged on the first wall so that the door is swivelable relative to the access opening around a first rotational axis,
  wherein the oblong flap is arranged on the access opening in a vertical direction parallel to the door, and swivelably arranged on a second rotational axis situated on a side of the access opening lying opposite the first rotational axis, and arranged parallel to the first rotational axis,
  wherein the door and oblong flap extend from the first rotational axis or second rotational axis to the second rotational axis or first rotational axis and together completely close the access opening in a closed state,
  wherein the door comprises a width at least two times a width of the flap, and
  wherein the flap comprises a handle extending at an angle from the flap and lying in a plane that comprises a distance of at most 20 cm from the second rotational axis.

12. The aircraft according to claim 11, wherein the furnishing item is a furnishing module integrated into a cabin monument.

* * * * *